April 5, 1949.  J. E. BECKER  2,466,356
TORQUE LIMITING DEVICE FOR FLUID CLUTCHES
Filed Feb. 14, 1946  2 Sheets-Sheet 1
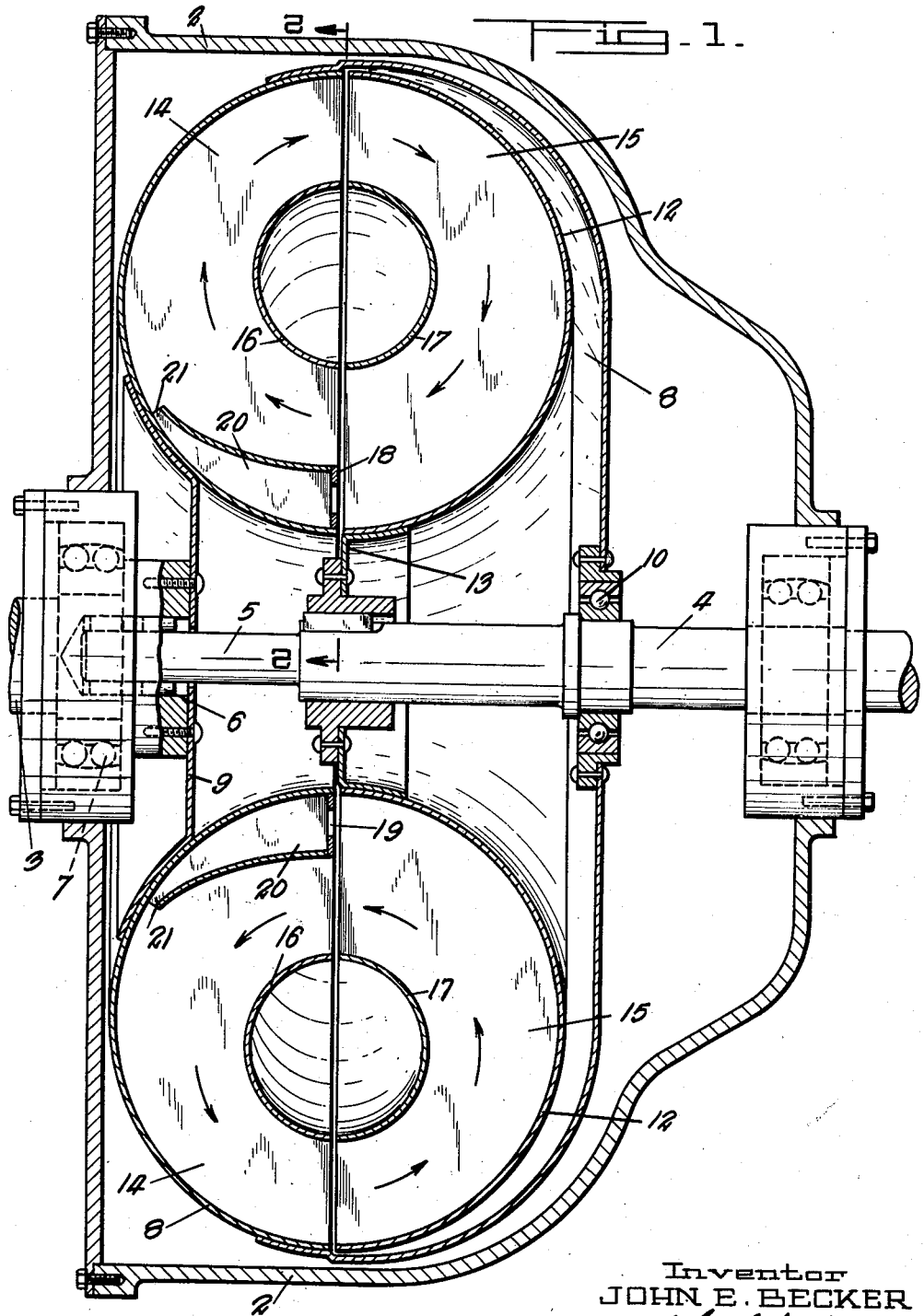
Inventor
JOHN E. BECKER
By
Attorney April 5, 1949.  J. E. BECKER  2,466,356
TORQUE LIMITING DEVICE FOR FLUID CLUTCHES
Filed Feb. 14, 1946  2 Sheets-Sheet 2
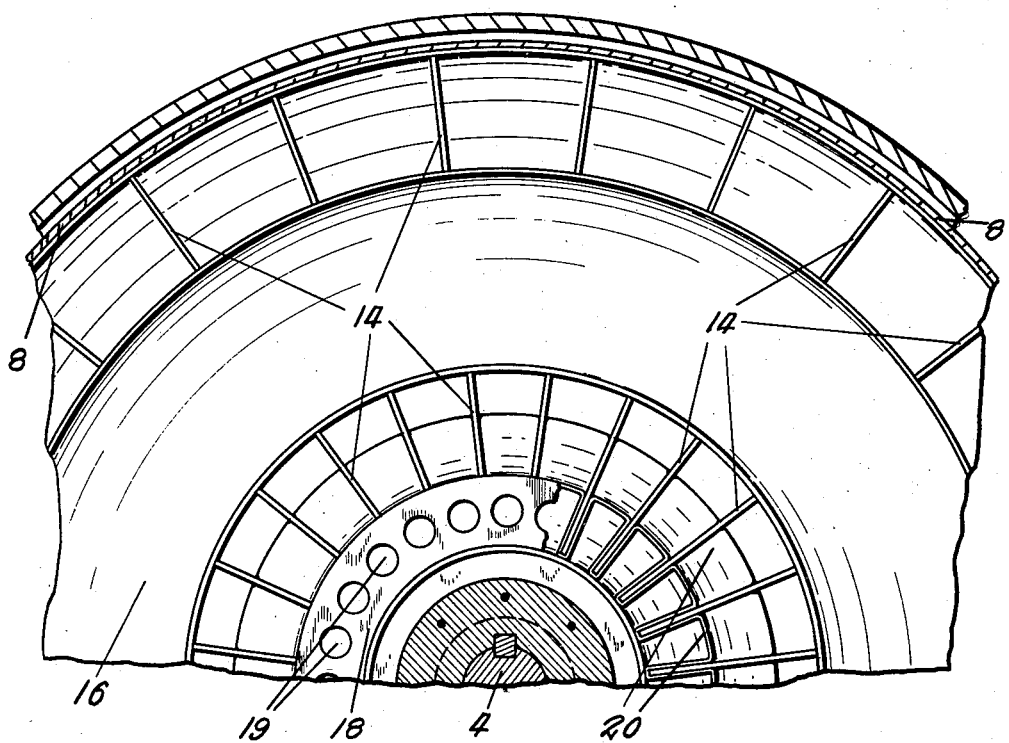
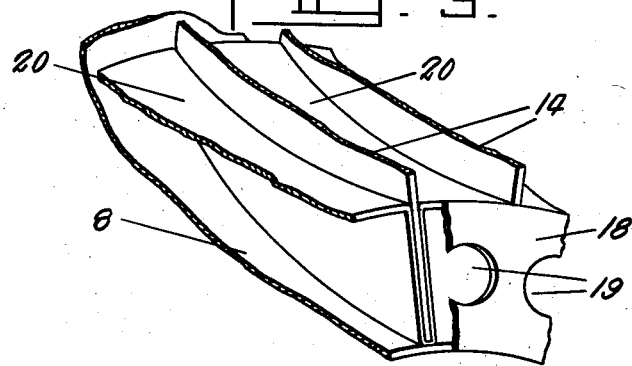
Inventor
JOHN E. BECKER
By 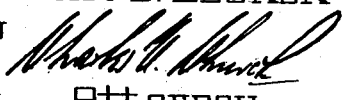
Attorney Patented Apr. 5, 1949

2,466,356

UNITED STATES PATENT OFFICE 2,466,356

TORQUE LIMITING DEVICE FOR FLUID CLUTCHES

John Edward Becker, Toronto, Ontario, Canada

Application February 14, 1946, Serial No. 647,567

2 Claims. (Cl. 103—115)

My invention relates to improvements in fluid clutches and the object of my invention is to provide a construction for limiting the torque transmitted when the load is sufficient to bring the runner assembly to a stand still.

With the foregoing and other objects in view as shall hereinafter appear, my invention consists of a fluid clutch constructed and arranged all as hereinafter more particularly described and illustrated in the accompanying drawings in which:

Figure 1 is a longitudinal cross-sectional view through my clutch.

Figure 2 is a transverse cross-sectional view through a fragmentary portion of my clutch, being taken through the line 2—2, Figure 1, and Figure 3 is a perspective view of a fragmentary portion of my torque limiting member.

Like characters of reference indicate corresponding parts in the different views of the drawings.

My clutch assembly is contained within a cylindrical casing 2, into which a driving shaft 3 projects, and from which a driven shaft 4 extends. The end 5 of the driven shaft 4 is of reduced diameter and extends into a needle bearing 6 contained within the end of the driving shaft 3. The driving shaft 3 is mounted within a ball bearing 7 in the casing 2.

An impeller housing 8 of orbicular form is contained within the casing 2 adjacent to the end of the driving shaft 3. One wall of the centre portion of the housing 8 is secured to a flange 9 on the end of the shaft 3, so that the housing rotates with the shaft. The centre portion of the other wall of the housing 8 is secured to a ball bearing 10 mounted upon the driven shaft 4.

The impeller housing 8 contains a concave ring shaped runner housing 12 having its central flange 13 keyed to the driven shaft 4. The impeller housing 8 contains a plurality of radial impeller blades 14, and the runner housing 12 contains a plurality of radial blades 15. The sets of blades 14 and 15 carry ring members 16 and 17, respectively, of semi-circular cross-section, following standard construction in fluid clutches.

When the driving shaft 3 is put in motion, the impeller housing 8 rotates therewith and the contained fluid is centrifugally thrown to the outer part of the impeller where it impacts the blades 15 of the runner housing 12 and causes such runner to rotate.

As the impeller housing 8 rotates the fluid assumes a vorticial flow between the blades of the impeller and the runner in the manner indicated by the arrows in Figure 1.

In order to limit the torque in cases where the impeller 8 is rotating and the runner 12 is reduced to a very slow speed or to a standstill under load, I provide a barrier formed around the inner periphery of the impeller, so that the vortex movement of the fluid in the paths indicated by the arrows in Figure 1 is obstructed by the barrier. Free circulation of the fluid is thus interfered with and the full torque is not transmitted.

My barrier comprises a ring plate 18 secured in front of the inner portions of the blades 14. The ring plate has orifices 19 therein which register with the fluid circulation spaces between the blades. The spaces between the blades carry tapered channel members 20 which are open at their ends and extend from the back of the ring plate 18 following the curvature of the impeller housing 8, as shown in Figure 1.

Under normal operating conditions the fluid circulates in inner vorticial paths clear of the ring plate 18. With the load stalled or approaching the stalling point i. e. with the runner stopped or approaching a standstill, the vorticial fluid flow is increased in diameter, where it meets the face of the ring plate 18 and passes through the orifices 19 into the channels 20, and through the restricted open ends 21 of the channels. The free circulation of the fluid is thus restricted and the full torque cannot be transmitted.

From the foregoing description it will be apparent that I have devised a very simple construction for limiting the torque transmitted in fluid clutches, and although I have illustrated and described a particular embodiment of my invention it is to be understood that I can make such changes and alterations as I may from time to time deem necessary, without departing from the spirit of my invention as set forth in the appended claims.

What I claim as my invention is:

1. In an impeller wheel for fluid clutches having a plurality of radial impeller blades mounted therein, of a torque reducing barrier member formed around the inner periphery of the impeller wheel in front of the edges of the impeller blades and having orifices therein which register with the spaces between the impeller blades, and wherein open ended fluid conduit members are positioned between the impeller blades and into which the orifices in the barrier member open.

2. In an impeller wheel for fluid clutches having a plurality of radial impeller blades mounted therein, of a torque reducing barrier member formed around the inner periphery of the impeller wheel in front of the edges of the impeller blades and having orifices therein which register with the spaces between the impeller blades, and wherein open ended fluid conduit members are positioned between the impeller blades and into which the orifices in the barrier member open, the conduits being tapered from the orifices to their open ends.

JOHN EDWARD BECKER.

REFERENCES CITED

The following references are of record in the file of this patent:

UNITED STATES PATENTS

| Number | Name | Date |
|---|---|---|
| 1,353,915 | Kime | Sept. 28, 1920 |
| 1,801,370 | Schmidt | Apr. 21, 1931 |
| 2,074,346 | Sinclair | Mar. 23, 1937 |

FOREIGN PATENTS

| Number | Country | Date |
|---|---|---|
| 446,530 | Great Britain | Apr. 27, 1936 |